(12) United States Patent
Gupta

(10) Patent No.: US 6,369,620 B1
(45) Date of Patent: Apr. 9, 2002

(54) CROSS COUPLED TRANSMITTER OUTPUT STAGE

(75) Inventor: Sandeep K. Gupta, Mountain View, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/672,953

(22) Filed: Sep. 29, 2000

(51) Int. Cl.[7] .................................................. H03K 3/00
(52) U.S. Cl. ........................ 327/108; 327/66; 327/101; 330/288
(58) Field of Search ............................. 327/65–67, 101, 327/563; 330/252, 253, 288

(56) References Cited

U.S. PATENT DOCUMENTS 4,547,685 A * 10/1985 Wong .......................... 327/54
5,546,026 A * 8/1996 Lin et al. ..................... 327/54
5,986,502 A * 11/1999 Nakamura ................. 330/258

* cited by examiner

Primary Examiner—Kenneth B. Wells
(74) Attorney, Agent, or Firm—Antonelli, Terry, Stout & Kraus, LLP

(57) ABSTRACT

A cross coupled output stage for a transmitter. It is desirable to have high impedance for a differential cascode output stage of an externally terminated transmitter in order to improve return loss. However, at high frequencies, parasitic capacitances cause shunts at the output nodes due to drain to bulk capacitances and negative feedback loops due to gate-to-drain capacitance. In order to counteract this, cross coupled capacitors are connected to the circuit to cause a positive feedback loop. This counteracts the reduction in impedance causing the impedance to remain high over all frequencies and to improve the return loss.

15 Claims, 5 Drawing Sheets

CROSS COUPLED TRANSMITTER OUTPUT STAGE

FIELD

The present invention is directed to an output stage for a transmitter. More particularly, the present invention is directed to a cross coupled output stage for a transmitter which has high impedance.

BACKGROUND

Transmitters which transmit digital signals onto a physical medium such as a cable have their outputs often terminated externally by an impedance which is supposed to match the characteristic impedance of the physical medium. In such cases their output stages should look like high impedance as seen from the outside so that the effective impedance is just determined by the external termination. This is useful in order to improve the return loss for the transmitter. The return loss is a measure of the reflection due to an impedance discontinuity created where the physical cable meets with a chip on which the transmitter is placed.

One such output stage which can be used is shown in FIG. 1. This is a pull-pull current mode driver configuration.

This device receives differential current inputs 20, 22 from a digital/analog converter (not shown) which in turn receives digital inputs, representing data to be transmitted, by the digital logic prior to it. Differential signals are used in order to cancel any extraneous noise from the signal, as is known. In the same manner, two outputs are also provided by the two halves of this differential cascode output stage at TXP and TXN. These two outputs are connected to a transformer 24 on opposite sides of a center tap in order to produce an external output at the line side 26 of the transformer. The center tap is hooked to an external power supply VCC which provides the differential current to both TXP and TXN side of the transmitter.

Each half of this circuit includes an arrangement of four n-type mos transistors. Two of these transistors 11 and 12, or 15 and 16 have their sources and drains serially connected between the input and ground and the other two 13 and 14, or 17 and 18 have their sources and drains connected between ground and the output. Gates of corresponding transistors in the two pairs are connected together. Current mode drivers such as these are highly popular since they present a high impedance when viewed from the outside.

However, there is a problem in that at high frequencies, parasitic device capacitances act as shunts and reduce the impedance.

First, the drain-to-bulk capacitance of devices 13 and 17 causes a shunt to be formed at the two outputs TXP and TXN resulting in lower impedance at high frequencies. Also, the gate-to-drain capacitance of devices 13 and 17 causes a negative feedback loop, lowering the output impedance. As seen in FIG. 1, when the drain of transistor 13, which is also connected to the node TXP, has a voltage which increases, the voltage of the gate of the same transistor also increases due to the gate-to-drain capacitance. Since transistor 11 is a source follower, the gate of transistor 12 also has a voltage which increases so that the voltage at the gate of transistor 14 also increases causing the node TXP to have a reduced voltage. This results in a negative feedback loop which lowers the output impedance of the output stage. Since the main purpose of the circuit is to have a high impedance, this unwanted negative feedback works against the function of the output stage. As a result, the impedance is reduced and the return loss gets worse. Though the second effect due to the gate to drain capacitance causing a negative feedback loop can be reduced in some alternative implementation, for example by driving the gates of device 13 and 17 by a low impedance source, the first effect due to the drain to bulk capacitance cannot be gotten rid of.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figure 1:
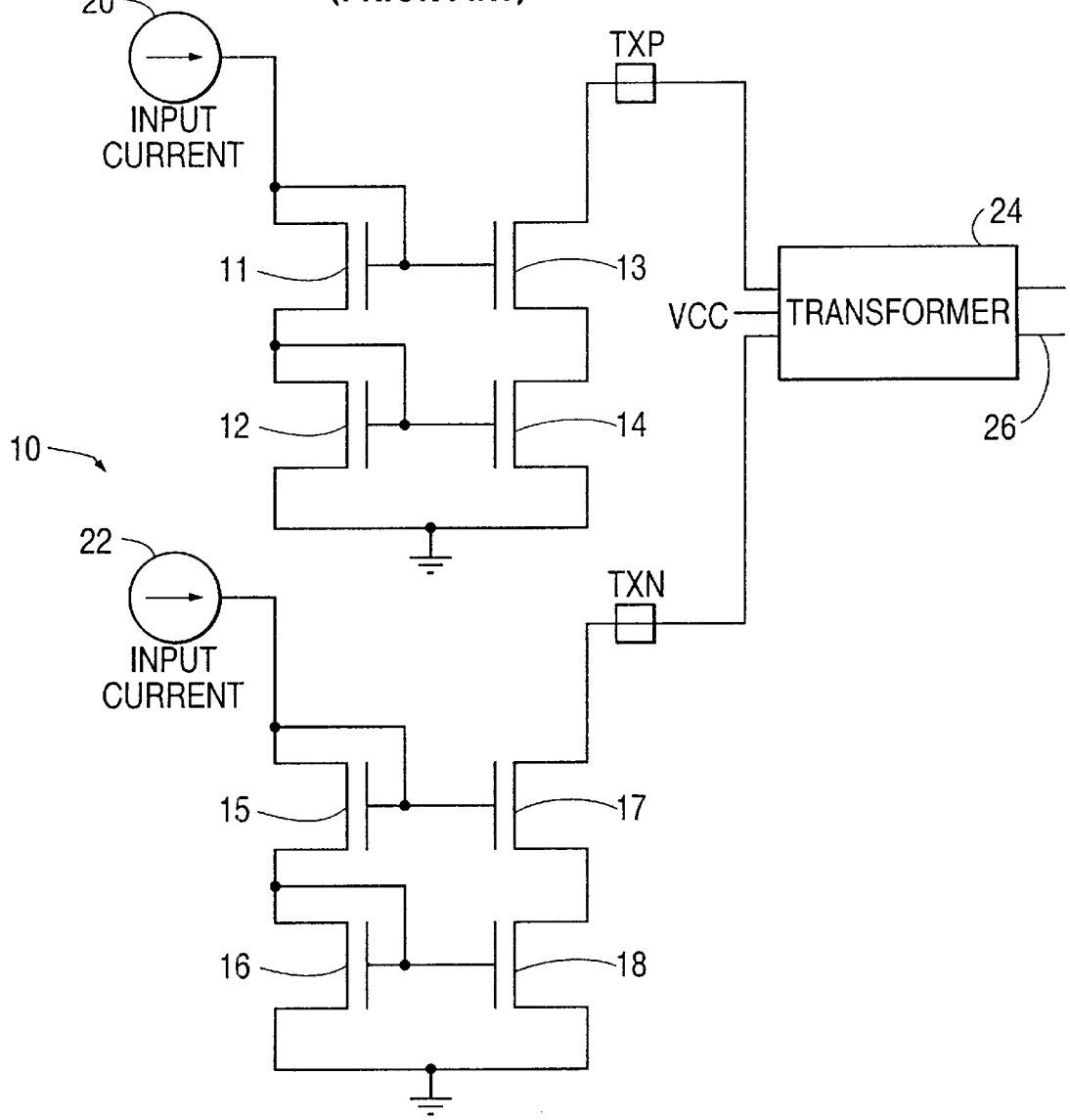
FIG. 1 is a schematic diagram of an example system having a disadvantageous arrangement.

Before beginning a detailed description of the subject invention, mention of the following is in order. When appropriate, like reference numerals and characters may be used to designate identical, corresponding or similar components in differing figure drawings. Further, in the detailed description to follow, example sizes/models/values/ranges may be given, although the present invention is not limited to the same. As a final note, well known power/ground connections to ICs and other components may not be shown within the FIGS. for simplicity of illustration and discussion, and so as not to obscure the invention. Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 2:
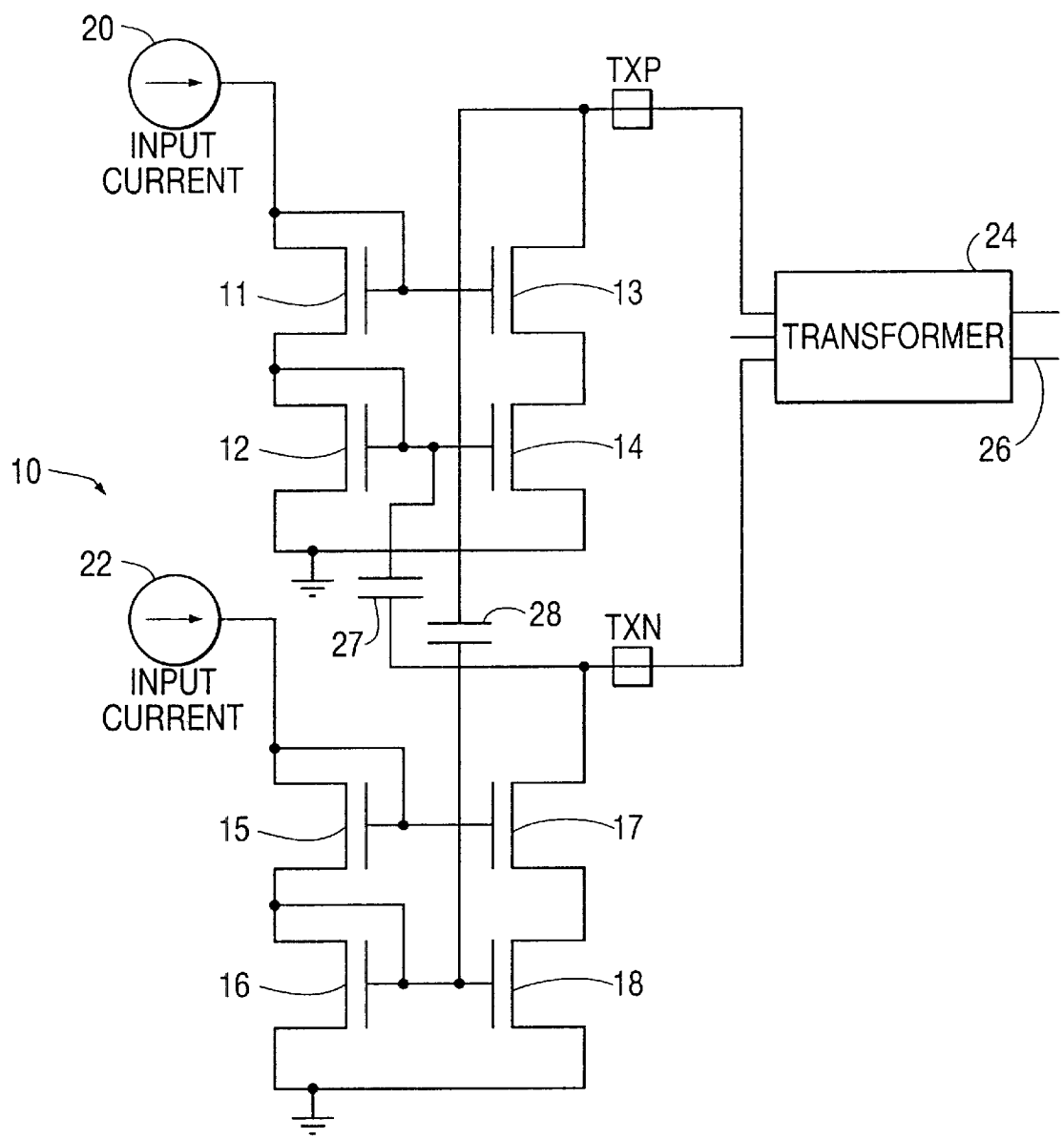
FIG. 2 is an example schematic diagram of the system having an advantageous arrangement of the present invention.

FIG. 2 shows an output stage for a transmitter having similar circuitry to that of FIG. 1. However, two capacitors 27 and 28 have been added to the circuit. Capacitor 28 has one side connected to a node TXP and the other side connected to the gate of transistor 18. Capacitor 27 has one side connected to a node TXN and the other side connected to the gate of transistor 14. These two transistors act to form local positive feedback loops at the output nodes so as to give a high impedance to the circuit. Thus, if node TXP has a voltage which increases, the gate of transistor 18 also has an increased voltage, causing node TXN to have a reduced voltage. Since this is coupled to the gate of transistor 14, this gate also has a decreased voltage causing TXP to increase even more. Accordingly, this positive feedback which is caused by the cross coupled capacitances makes the impedance look high. Accordingly, it overcomes the negative feedback loop caused by parasitic capacitance which tries to lower the impedance. It is also necessary that the gain of this positive feedback loop be sufficiently low so that it does not reduce the stability of the main transmitter. The value of the capacitance can be determined by simulation based on the actual sizes of devices 13, 14, 17, and 18. In one of the implementations, 6–8 db improvement in the return loss was obtained before stability of the driver is degraded. Just how much capacitance can be put into a transmitter before it appreciably affects transient behavior depends on the design of the transmitter.

Another possible way of connecting these capacitors is to connect capacitor 28 to the gate of device 17 and capacitor 27 to the gate of device 13. This should also result in a local positive feedback loop resulting in improved return loss performance.

Figure 3:
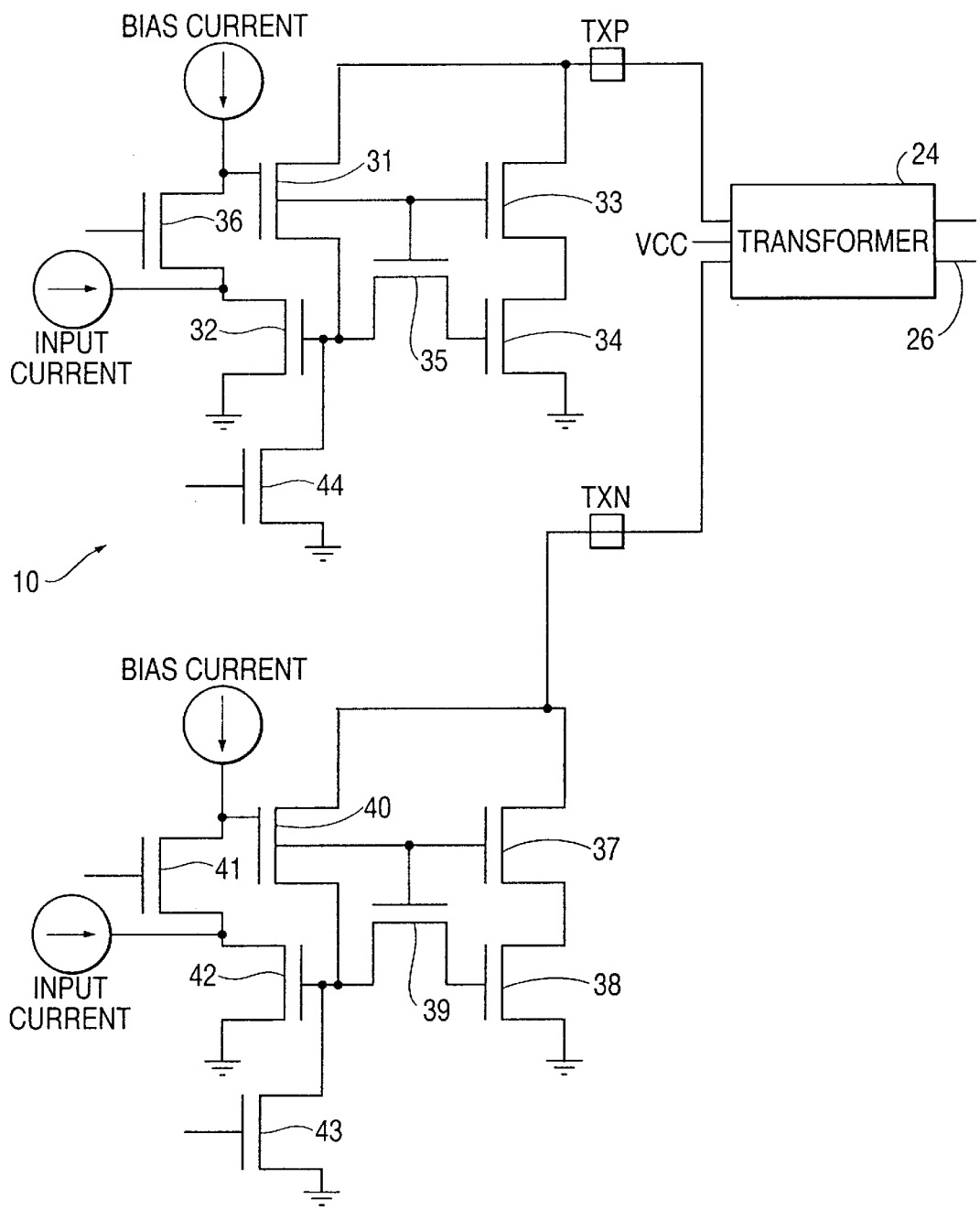
FIG. 3 is a schematic diagram of an example system having a disadvantageous arrangement.

FIG. 3 shows another output stage 30 of the differential cascode type with similar nodes TXP and TXN connected to inputs to a transformer 24 leading to output lines 26. In this device, additional n-type mos transistors are utilized with six transistors in each half rather than four. However, the four transistors on the right hand side, 33, 34, 37 and 38 are arranged very similarly to transistors 13, 14, 17 and 18 in FIGS. 1 and 2. This arrangement further provides additional biases to drive the additional transistors. While this arrangement may be preferable to the output stage shown in FIG. 1 for some purposes, it still suffers with the same problem of the device shown in FIG. 1, namely the negative feedback loop due to gate to drain capacitances and the shunt formed at the nodes TXP and TXN due to drain to bulk capacitance, causing the circuit to have a lower impedance at high frequencies and hence a worse return loss.

Figure 5:
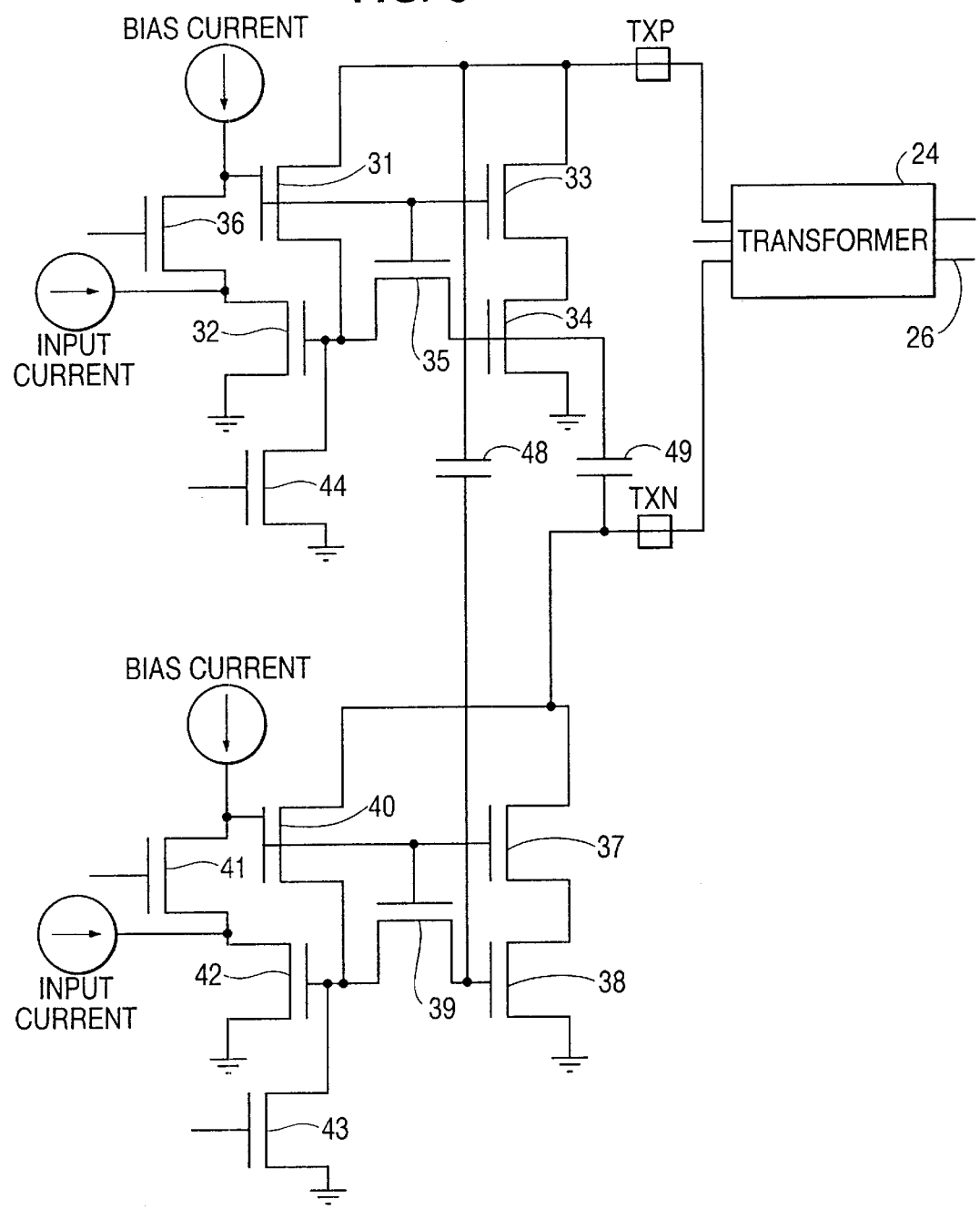
FIG. 5 is an example schematic diagram of the system having an advantageous arrangement of the present invention.

The circuit can be improved by utilizing the same idea of cross coupled capacitors in a fashion analogous to the device shown in FIG. 2. As shown in FIG. 5, capacitor 49 may be connected at one side to node TXN and at the other side to transistor 34. This is similar to the arrangement of capacitor 27 in FIG. 2. Capacitor 48 is connected on one side to node TXP and the other side to the gate of transistor 38. This is analogous to capacitor 28 shown in FIG. 2.

Figure 4:
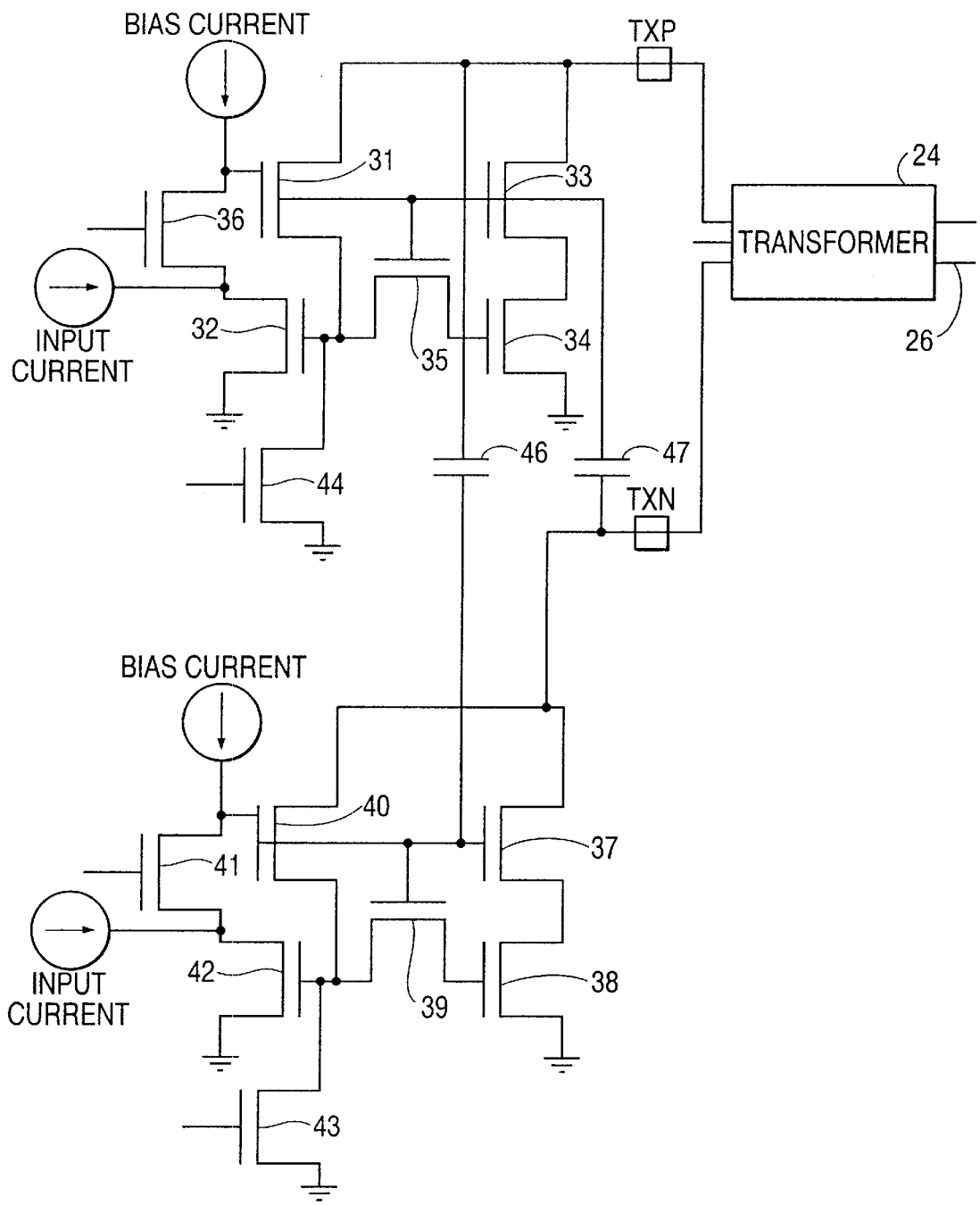
FIG. 4 is an example schematic diagram of the system having an advantageous arrangement of the present invention.

Another arrangement is shown in FIG. 4, which is analogous to the alternative device of FIG. 2, where capacitors 46 and 47 are connected on one side to the nodes in the same fashion but on the other side to transistors 33 and 37 rather than 34 and 38. The arrangement of FIG. 4 may perform slightly better for some applications than that shown in FIG. 5 but worse in other applications. This is because in this implementation any additional capacitance at the gate of the cascode device tends to stabilize the loop to some extent because it affects the dominant pole of the system. Hence a higher value of the coupling capacitor can be used before it starts to affect the stability of the transmitter.

While this arrangement has been shown in regard to two specific embodiments of output stages, it may be useful for a number of similar circuits where high impedance is desirable. In particular, this is suitable for any arrangement having four transistors and two nodes arranged in a fashion similar to transistors 13, 14, 17 and 18 shown in FIG. 1 or transistors 33, 34, 37 and 38 in FIG. 3. It is also usable where the transmitter is externally terminated, has a differential output and is cascode.

Also, although this system has been shown with n-type mos transistors, it may be similarly applicable to other types of transistors, for instance FET devices, bipolar transistors and p-mos type transistors.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A high impedance output stage for a transmitter, comprising;

first and second differential output nodes;

a first transistor connected between said first differential output node and ground;

a second transistor connected between said second differential output node and ground;

a first capacitor connected between said first differential output node and a gate of said second transistor; and a second capacitor connected between said second differential output node and a gate of said first transistor.

2. The output stage according to claim 1, further comprising a third transistor serially connected to said first transistor and said first differential output node; and a fourth transistor serially connected to said second transistor and said second differential output node.

3. The output stage according to claim 1, wherein said first and second differential output nodes are connected to opposite taps of a transformer and a center tap of the transformer is connected to a power supply.

4. The output stage according to claim 1, wherein said first and second capacitors form a positive feedback loop at the output nodes.

5. A high impedance output stage for a transmitter, comprising:

first and second differential output nodes;

a first transistor connected to said first differential output node;

a second transistor connected to said second differential output node;

a first capacitor connected between said first differential output node and a gate of said second transistor;

a second capacitor connected between said second differential output node and a gate of said first transistor;

a third transistor serially connected to said first transistor and said first differential output node; and a fourth transistor serially connected to said second transistor and said second differential output node;

wherein said first and third transistors are connected source-to-drain between said first output node and ground; and said second and fourth transistors are connected source-to-drain between said second differential output node and ground.

6. A high impedance output stage for a transmitter, comprising:

first and second differential output nodes;

a first transistor connected to said first differential output node;

a second transistor connected to said second differential output node;

a first capacitor connected between said first differential output node and a gate of said second transistor;

a second capacitor connected between said second differential output node and a gate of said first transistor;

a third transistor serially connected to said first transistor and said first differential output node; and a fourth transistor serially connected to said second transistor and said second differential output node;

four additional transistors receiving differential inputs each of said four additional transistors forming a respective current mirror with each of said first through fourth transistors.

7. A high impedance output stage for a transmitter, comprising:

first and second differential inputs;

first and second differential output nodes;

first and second transistors serially connected between ground and said first differential output node;

third and fourth transistors serially connected between ground and said second differential output node;

a transformer being connected to said first and second differential output nodes on two opposite taps and having an output;

a first capacitor connected between said first differential output node and a gate of one of said third and fourth transistors; and a second capacitor connected between said second differential output node and a gate of one of said first and second transistors.

8. The output stage according to claim 7, wherein the first capacitor is connected to the gate of the fourth transistor and the second capacitor is connected to the gate of the second transistor.

9. The output stage according to claim 7, wherein said first and second capacitors form a positive feedback loop.

10. The output stage according to claim 7, further comprising fifth and sixth transistors serially connected between said first input and ground and forming a current mirror to said first and second transistors; and seventh and eighth transistors serially connected between said second input and ground and forming a current mirror to said third and fourth transistors.

11. The output stage according to claim 10, wherein gates of said first and fifth transistors are connected, gates of said second and sixth transistors are connected, gates of said third and seventh transistors are connected and gates of said fourth and eighth transistors are connected.

12. The output stage according to claim 7, further comprising a fifth transistor connected to said first input and ground and a sixth transistor connected to said second input and ground.

13. The output stage according to claim 12, wherein gates of said second and fifth transistors are connected through a seventh transistor and gates of said fourth and sixth transistor are connected through an eighth transistor.

14. A method of making an output stage for a transmitter comprising:

providing first and second differential output nodes;

serially connecting first and second transistors between said first differential output node and ground;

serially connecting third and fourth transistors between said second differential output node and ground;

connecting a first capacitor between said first differential output node and a gate of one of said third and fourth transistors; and connecting a second capacitor between said second differential output node and a gate of one of said first and second transistors.

15. The method according to claim 14, wherein said first capacitor is connected to a gate of said fourth transistor; and said second capacitor is connected to a gate of said second transistor.

* * * * *